(12) United States Patent
Julia et al.

(10) Patent No.: US 10,334,024 B2
(45) Date of Patent: Jun. 25, 2019

(54) ELECTRONIC COMMUNICATION DEVICE

(71) Applicant: Samsung Electronics Co., Ltd., Suwon-si, Gyeonggi-do (KR)

(72) Inventors: Luc Julia, Palo Alto, CA (US); Gilles Mazars, Paris (FR); Jerome Laurent Dubreuil, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 15/161,094

(22) Filed: May 20, 2016

(65) Prior Publication Data

US 2017/0208118 A1 Jul. 20, 2017

Related U.S. Application Data

(60) Provisional application No. 62/281,109, filed on Jan. 20, 2016.

(51) Int. Cl.
*G06F 15/16* (2006.01)
*H04L 29/08* (2006.01)

(52) U.S. Cl.
CPC .............. *H04L 67/10* (2013.01); *H04L 67/26* (2013.01)

(58) Field of Classification Search
CPC ................................ H04L 67/10; H04L 67/26
See application file for complete search history.

(56) References Cited

U.S. PATENT DOCUMENTS

| | | | |
|---|---|---|---|
| 9,009,230 B1* | 4/2015 | Matthieu | H04L 69/08 709/204 |
| 9,053,124 B1 | 6/2015 | Dornquast et al. | |
| 9,146,769 B1* | 9/2015 | Shankar | G06F 9/45558 |
| 9,882,929 B1* | 1/2018 | Ettema | H04L 63/145 |
| 2013/0332614 A1 | 12/2013 | Brunk et al. | |
| 2014/0108793 A1* | 4/2014 | Barton | G06F 21/6218 713/165 |
| 2014/0109174 A1* | 4/2014 | Barton | H04W 12/08 726/1 |
| 2015/0256641 A1 | 9/2015 | Agarwal et al. | |
| 2015/0278245 A1 | 10/2015 | Sagar et al. | |
| 2015/0278531 A1 | 10/2015 | Smith et al. | |
| 2015/0372865 A1 | 12/2015 | Schmirler et al. | |
| 2016/0366023 A1* | 12/2016 | Higgins | H04L 41/12 |
| 2017/0005878 A1* | 1/2017 | Strandzhev | H04L 41/20 |
| 2017/0126755 A1* | 5/2017 | Singh | H04L 65/4023 |

* cited by examiner

*Primary Examiner* — Jonathan A Bui
(74) *Attorney, Agent, or Firm* — Lewis Roca Rothgerber Christie LLP

(57) ABSTRACT

An electronic device includes: a processor; and a memory coupled to the processor, wherein the memory stores instructions that, when executed by the processor, cause the processor to: transmit a request, from a first module to a first external cloud, to receive data regarding a first electronic device in communication with the first external cloud; receive the data regarding the first electronic device from the first external cloud; store, in the memory, the data regarding the first electronic device as part of a representation of the first electronic device; receive data regarding a second electronic device from a second external cloud; and transmit a signal to the first external cloud in response to receiving the data regarding the second electronic device for controlling an operation of the first electronic device.

20 Claims, 10 Drawing Sheets

```
{
  // URL used to perform Authorization Request.
  // Required for Oauth1 and Oauth2.
  // type: string (url format, no querystring)
  "authorizationUrl": ", // URL used to for Access Token Request.
  // Request to have a token (with code or with refresh token)
  // Required for Oauth1 and Oauth2.
  // type: string (url format, no querystring)
  "accessTokenUrl": ", // A Mapping table used to rename parameters on the response of an
  //Access Token Request.
  // Existing parameter name for Oauth2: "access_token", "expires_in", "scope",
  //"refresh_token", "userid", "token_type", "external_id"
  // Existing parameter name for Oauth1: "external_id"
  // optional default: null (== no mapping)
  // eg:
  // {
  //    "access_token":"AccessToken",
  //    "external_id":"UserId"
  // }
  "accessTokenUrlMapper": null, // clientId provided by third party cloud to the host cloud CloudConnector
  //Application
  // required
  // type: string (no blank)
  "clientId": "myClientId", // clientSecret provided by third party cloud to the host cloud CloudConnector
  //Application
  // required
  // type: string (no blank)
  "clientSecret": "abigsecret", // Authorization protocol to connect to third party cloud.
  // optional default: "OAuth2"
  // type: value from ["OAuth1", "OAuth2"]
  "authType": "OAuth2",
}
```

FIG. 3B

ELECTRONIC COMMUNICATION DEVICE

CROSS-REFERENCE TO RELATED APPLICATION

The present application claims priority to and the benefit of U.S. Provisional Patent Application Ser. No. 62/281,109, entitled "SYSTEM AND METHOD FOR CONNECTING A CLOUD TO A DATA EXCHANGE PLATFORM," filed in the United States Patent and Trademark Office on Jan. 20, 2016, the entire content of which is incorporated herein by reference.

BACKGROUND

Electronic devices capable of collecting data about their environment and transmitting such data to other electronic devices have become ubiquitous in modern life. Many consumer electronic devices now arrive on store shelves with sophisticated processing and computing power and the ability to connect to data communication networks to exchange data. Many manufacturers of consumer electronic devices design their products with the intention of enabling collection or exchange of data to enhance the functionality of their products.

The above information disclosed in this Background section is only for enhancement of understanding of the background of the disclosure and therefore it may contain information that does not constitute prior art.

SUMMARY

Aspects of embodiments of the present disclosure include an electronic communication device and a system and method for connecting a cloud to a data exchange platform.

According to some example embodiments, an electronic device includes: a processor; and a memory coupled to the processor, wherein the memory stores instructions that, when executed by the processor, cause the processor to: transmit a request, from a first module to a first external cloud, to receive data regarding a first electronic device in communication with the first external cloud; receive the data regarding the first electronic device from the first external cloud; store, in the memory, the data regarding the first electronic device as part of a representation of the first electronic device; receive data regarding a second electronic device from a second external cloud; and transmit a signal to the first external cloud in response to receiving the data regarding the second electronic device for controlling an operation of the first electronic device.

According to some embodiments, the instructions further cause the processor to transmit a signal to authenticate the module for permission to access information stored on the first external cloud.

According to some embodiments, the first module is unique to the first external cloud.

According to some embodiments, the instructions further cause the processor to transmit a request from the first module to the first external cloud to subscribe to notifications from the first external cloud regarding data received from the first electronic device.

According to some embodiments, the instructions further cause the processor to receive a notification from the first external cloud that the first external cloud has received the data regarding the first electronic device.

According to some embodiments, the data regarding the second electronic device comprises an instruction to transmit a signal to the first electronic device for controlling the operation of the first electronic device.

According to some example embodiments, an electronic communication system includes: a server comprising a processor and a memory; data corresponding to a first electronic device stored in the memory; a first cloud connector configured to interact with an application program interface (API) of a first external cloud system; and a second cloud connector configured to interact with an API of a second external cloud system.

According to some embodiments, the data corresponding to the first electronic device comprises unique identification information corresponding to the first electronic device.

According to some embodiments, the server is configured to receive information regarding the first electronic device by way of the first cloud connector.

According to some embodiments, the server is configured to receive information regarding a second electronic device by way of the second cloud connector.

According to some embodiments, the information regarding the second electronic device comprises an instruction for controlling an operation of the first electronic device.

According to some embodiments, the server is configured to transmit a signal to the first cloud system for controlling the operation of the first electronic device in response to receiving the information regarding the second electronic device.

According to some example embodiments, in a method of managing electronic communications, the method includes: transmitting, by a processor, a request, from a first module to a first external cloud, to receive data regarding a first electronic device in communication with the first external cloud; receiving, by the processor, the data regarding the first electronic device from the first external cloud by way of the first module; storing, by the processor, in a memory, the data regarding the first electronic device as part of a representation of the first electronic devices; receiving, by the processor, data regarding a second electronic device from a second external cloud by way of a second module; and transmitting, by the processor, a signal to the first external cloud in response to receiving the data regarding the second electronic device for controlling an operation of the first electronic device.

According to some embodiments, the method further includes transmitting, by the processor, a signal to authenticate the module for permission to access information stored on the first external cloud.

According to some embodiments, the first module is unique to the first external cloud.

According to some embodiments, the second module is unique to the second external cloud.

According to some embodiments, the method further includes transmitting, by the processor, a request from the first module to the first external cloud to subscribe to notifications from the first external cloud regarding data received from the first electronic device.

According to some embodiments, the method further includes receiving, by the processor, a notification from the first external cloud that the first external cloud has received the data regarding the first electronic device.

According to some embodiments, the data regarding the second electronic device comprises an instruction to transmit a signal to the first electronic device for controlling the operation of the first electronic device.

According to some embodiments, the first module and the second module are unique to the first external cloud and the second external cloud, respectively.

BRIEF DESCRIPTION OF THE DRAWINGS

A more complete appreciation of the present disclosure, and many of the attendant features and aspects thereof, will become more readily apparent as the disclosure becomes better understood by reference to the following detailed description when considered in conjunction with the accompanying drawings in which like reference symbols indicate like components, wherein:

FIG. 3B shows example code for data to be stored as part of an internal representation on a host cloud of an electronic device, according to one embodiment;

DETAILED DESCRIPTION

Aspects of embodiments of the present disclosure relate to a system and method for connecting a cloud to a data exchange platform.

In recent years, consumer demand for electronic devices with the capability of connecting or communicating with other electronic devices has increased, and many consumer electronic devices have been developed that can connect to an "Internet of Things" (IoT). An IoT includes a network of physical devices having embedded processors and memory, software, sensors, network connection capability that enables such devices to collect information about their environment and exchange data with other IoT devices. In many circumstances, the exchange of data between such IoT devices may be for the purpose of achieving some particular goal or solving some particular problem.

Many common consumer electronic devices are currently capable of connecting to an IoT network for exchanging data with other electronic devices. Such IoT connection capabilities open up vast opportunities to improve the functionality of electronic devices and the consumers who use them. By recognizing the benefits of IoT capable devices, many consumer electronic device manufacturers have developed corresponding systems for collecting data from their devices for analysis and use by users of their electronic devices. For example, in the case of an IoT-capable smart watch, whose functionality includes collecting data about the physical activity of its wearer, the manufacturer of the IoT-capable smart watch may provide a cloud-based service or platform (e.g., in the form of a network-connected computer system or server) to which consumers can connect their smart watch. Consumers may then utilize the data collected by the platform to monitor their fitness progress, track fitness achievements, and the like.

Thus, various household appliances or wearable devices may include functionality for connecting to a cloud that is hosted or managed by the product manufacturer to collect and analyze data from various sensors in the products and to enable the functionality of the products to be controlled or enhanced by the cloud. In many instances, however, there is no mechanism for different consumer electronic devices to communicate with one another, even if the devices have the capability of connecting to a cloud system.

Thus, embodiments of the present disclosure operate as a platform to enable the exchange of data and instructions between different electronic devices by connecting a host cloud to third-party or external clouds that are in electronic communication with the electronic devices. By utilizing the host cloud system according to embodiments of the present disclosure, users may pass data from one electronic device to another electronic device to control the functionality of the electronic devices.

Figure 1:
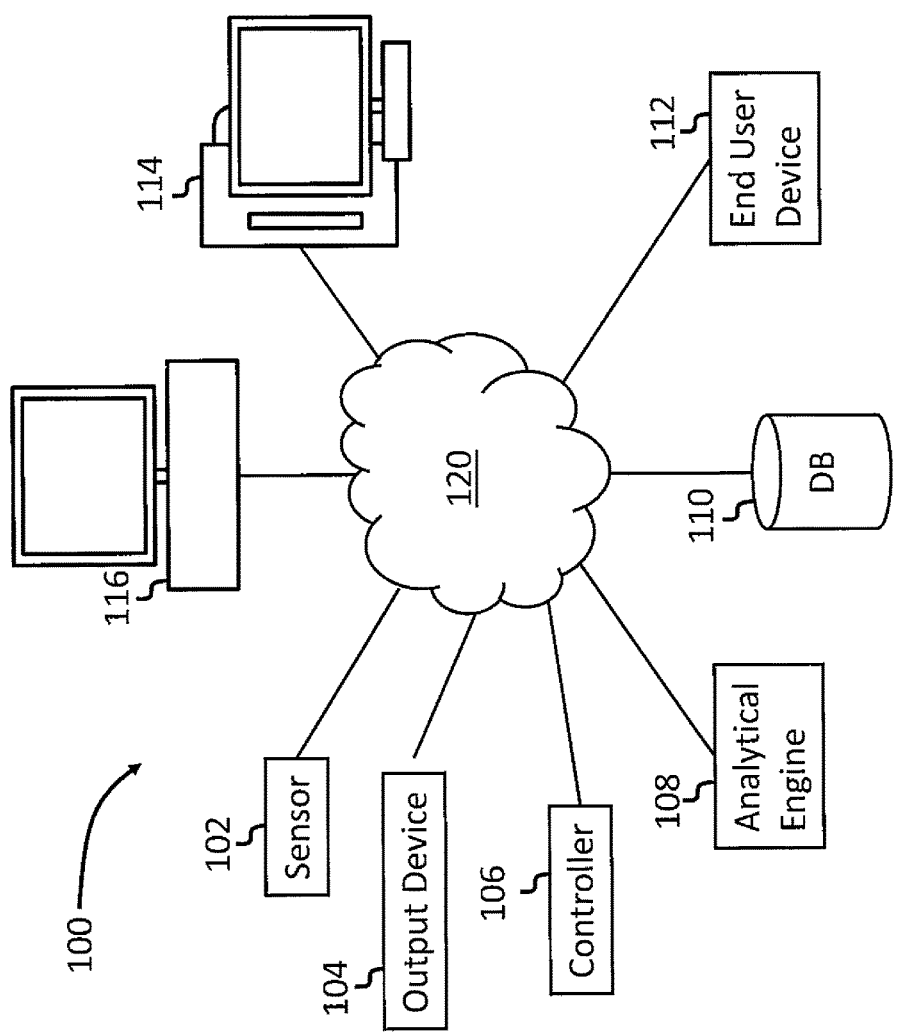
FIG. 1 is a block diagram illustrating an example of an Internet of Things system, according to one embodiment.

FIG. 1 is a block diagram illustrating an example of an Internet of Things (IoT) system, according to one embodiment. A system 100 includes various electronic devices 102 through 116, which communicate with each other over a communication network 120 to achieve results either with minimum or very little human intervention or without any human intervention (e.g., non-men-in-the-loop). The various electronic devices may include one or more of: a sensor 102; an output device 104; a controller 106, an analytical engine 108; a databases or mass storage devices 110; an end user or electronic device 112 (e.g., personal computer, handheld personal computer, personal digital assistant, tablet or touch screen computer system, mobile or cellular telephone, smartphone, smart watch, wearable electronic device, virtual reality headset, and/or any other suitable consumer electronic device); and computer systems 114 and 116 (e.g., laptop, desktop, and server/host).

The electronic devices 102 through 116 may be in electrical communication with one another (e.g., using any suitable wired or wireless communication configuration and protocol) by way of the communication network 120. The communication network 120 may be any suitable communication network, for example, a local area network or a wide area network (e.g., the Internet).

The data is generated by sensors included in one or more of the electronic devices 102 through 116, and the sensor data is accumulated and/or analyzed to achieve a result. In many cases, the result or the decision may be achieved in real-time or in a much smaller amount of time than a human being would be capable of achieving.

Many of the electronic devices 102 through 116 may be mobile devices, such that the devices may be supplied with portable power sources, such as rechargeable or replaceable batteries. Also, the form factor of the portable power sources may be influenced by the nature of the user devices. For example, the portable power sources may be bendable or rollable to support various configurations of user devices such as wearable devices that have various different form factors.

Different devices and processors located at various different locations may be able to work together to process the accumulated data and/or to work together to come up with a solution to a particular problem.

Over the network, which may be a computer network, the modularized components and/or devices and/or software can communicate with each other to jointly generate or obtain a solution. Also, because of the availability of data on an individual basis, any solutions that are produced can be customized (or tailored) to suit the requirements of the individuals at that time.

While IoT is related to accumulation, processing, and analysis of data generated by sensors, and the implementation of solutions can be carried out without or with minimum human involvement, a man-machine interface (e.g., such as using display such as one requiring graphics user interface (GUI)) may be included in many situations for the devices to communicate with humans. Therefore, display devices, e.g., mobile display devices, may be included as part of the IoT architecture.

Embodiments of the present disclosure provide a platform and framework for enabling users to communicate and exchange data between various IoT-capable or network-connectable electronic devices to control the operation or functionality of such devices.

Figure 2:
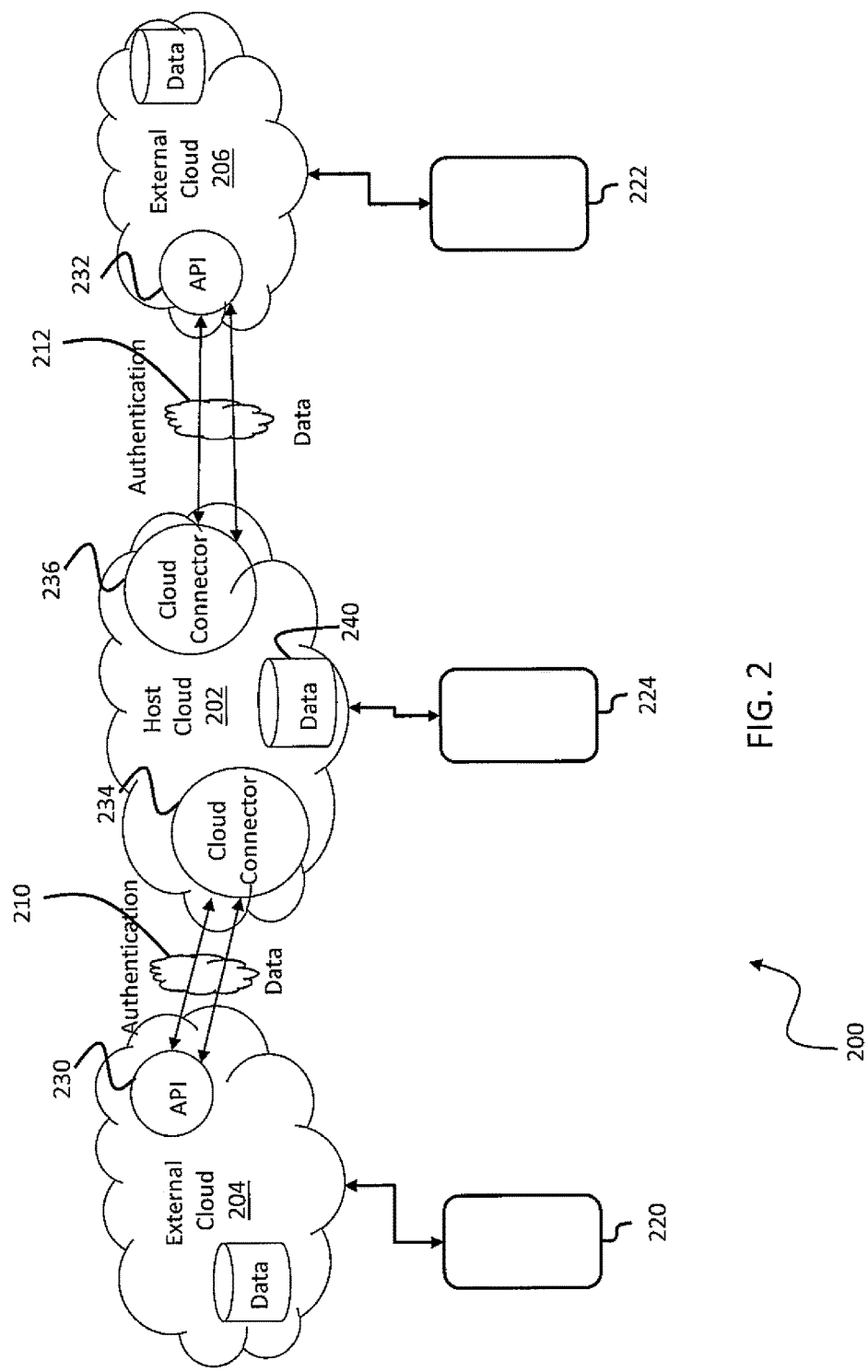
FIG. 2 is a block diagram illustrating an electronic communication system, according to one embodiment.

FIG. 2 is a block diagram illustrating an electronic communication system, according to one embodiment. An electronic communication system 200 operates as part of an IoT system (e.g., the IoT system 100) includes a host server or cloud 202, and a third-party or external server or cloud 204 in electronic communication with the host cloud 202 by way of a communication channel or network 210. Additionally, according to some embodiments of the present disclosure, the electronic communication system 200 may also include another third-party or external server or cloud 206 in electronic communication with the host cloud 202 by way of the communication network 212. The communication networks 210 and 212 may utilize any suitable communication channel and protocol according to the design of the electronic communication system 200, and may include a private or public switched telephone network (PSTN), local area network (LAN), private wide area network (WAN), and/or public wide area network such as, for example, the Internet. The communications networks 210 and 212 may also include a wireless carrier network including a code division multiple access (CDMA) network, global system for mobile communications (GSM) network, and/or any 3G or 4G network conventional in the art.

The external clouds 204 and 206 may be in electronic communication (e.g., by way of any suitable communication channel or network, such as communication network 210) with a plurality of electronic devices 220 and a plurality of electronic devices 222, respectively. Additionally, according to some embodiments, the host cloud 202 may be in electronic communication (e.g., by way of any suitable communication channel or network, such as communication network 210 or 212) with a plurality of electronic devices 224. The electronic devices 220, 222, and 224 may be the same or similar to the electronic devices 102-116 described above with respect to FIG. 1, and may also include any other suitable electronic device capable of sending data to and receiving data from other electronic devices according to the design of the electronic communication system 200.

The various servers of FIG. 2 (e.g., the host cloud 202, and the external clouds 204 and 206) may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present disclosure.

Each of the external clouds 204 and 206 and the host cloud 202 are configured to collect data from the electronic devices 220, 222, and 224, respectively. The external clouds 204 and 206 may be, for example, managed or operated by the manufacturer of the electronic devices 220 and 222, or may otherwise be affiliated with the manufacturer of the electronic devices 220 and 222. Embodiments of the present disclosure are not limited thereto, however, and the external clouds 204 and 206 may be any server or cloud system configured to receive data from and transmit data to the electronic devices 220 and 222.

For example, for the purposes of illustration, suppose the electronic device 220 is a wearable electronic device capable of monitoring and tracking the physical activity of a user wearing the electronic device 220. The external cloud 204 may be configured to receive data from the electronic device 220 to track the physical activity or health of the user over time. Additionally, the external cloud 204 may be configured to analyze the data received from the electronic device 220 and, for example, transmit a signal to the electronic device 220 to alert the user to increase physical activity in order to achieve a particular fitness goal. Thus, the external cloud 204 may operate to exchange data with the electronic device 220 for the purpose achieving a particular goal or solution to a problem.

As another example, suppose the electronic device 220 is a smart thermostat for monitoring and controlling the temperature inside a building or room. The external cloud 204 may be configured to receive data from the electronic device 220 to track the temperature of the environment of the electronic device 220 over time. Additionally, the external cloud 204 may be configured to provide a user interface (e.g., accessible through a web browser or application running on another electronic device or computer system) for enabling the user of the electronic device 220 to monitor the temperature of a room, energy consumption over time, or controlling the electronic device 220 in increase or decrease the temperature of the room. In response to user commands, the external cloud 204 may then transmit a signal to the electronic device 220, for example, to increase or decrease the temperature.

Suppose, at the same time, that the electronic device 222 is a smart phone or tablet computer also owned or operated by the user of the electronic device 220. The external cloud 206 may be configured to exchange data with the electronic device 222. Additionally, however, the user may wish to utilize the electronic device 222 to monitor or control the electronic device 220. In many instances, however, the manufacturer of the electronic device 220 may be a different entity from the manufacturer of the electronic device 222, and the electronic devices 220 and 220 and external clouds 204 and 206 may not be configured to communicate with one another directly.

To connect a device to the host cloud 202, software code or modules can be installed locally on each electronic device itself to enable compatibility between the electronic device and the host cloud 202. Installing software to enable electronic devices to exchange data with the host cloud 202 may be possible if the electronic device manufacturer is willing to collaborate directly with the host cloud 202 to install such software before selling the electronic device to consumers. Recruiting manufacturers of electronic devices to incorporate their products into the ecosystem of the host cloud 202, however, may be difficult, time consuming, and expensive. Furthermore, even if an electronic device manufacturer is willing to configure their devices to communicate directly with the host cloud 202, the manufacturer may have already sold many products to consumers prior to establishing a relationship with the host cloud 202, and it may be difficult or impossible to configure such devices to communicate with the host cloud 202 after they are sold to consumers.

According to embodiments of the present disclosure, however, the host cloud 202 may operate as a platform for facilitating the exchange of data between the electronic devices 220 and 222, by collecting or receiving data from the electronic devices 220 and 222 from their respective external clouds 204 and 206, and sending or transmitting data to the electronic devices 220 and 222 through their respective external clouds 204 and 206.

In many instances, the external cloud 204 may include an application program interface (API) 230 and the external cloud 206 may include an API 232, but the API 230 and the API 232 are not standardized in a way that enables external devices to universally interact with both APIs 230 and 232. Thus, according to embodiments of the present disclosure, the host cloud 202 may have a first cloud connector or module 234 operating or running as part of the host cloud 202 for interfacing with the API 230 and facilitating the exchange of data between the host cloud 202 and the external cloud 204. Additionally, the cost cloud 202 may have a second cloud connector or module 236 operating or running as part of the host cloud 202 for interfacing with the API 232 and facilitating the exchange of data between the host cloud 202 and the external cloud 206.

By utilizing the cloud connectors to interface with the API of external cloud systems, embodiments of the present disclosure provide a mechanism for enabling various network-connectable electronic devices to communicate with, exchange data between, and control the operation of one another. Additionally, according to embodiments of the present disclosure, any developer or user may create a cloud connector for enabling the host cloud 202 to interface with any external cloud that provides a publicly available API. Thus, the creation of cloud connectors need not be a coordinated effort between the entities managing the various external clouds and the host cloud. The process of creating and instantiating a cloud connector is described in more detail below.

By utilizing the cloud connectors to communicate with the external clouds 204 and 206 using calls to the publicly available APIs 230 and 232, the host cloud 202 operating as part of the electronic communication system 200 can collect data transmitted from the electronic devices 220 and 222 to the external clouds 204 and 206. Additionally, because the electronic devices 220 and 222 may be effectively in, communication with or connected to the host cloud 202, the host cloud 202 may pass commands or instructions to the electronic devices 220 and 222 to control an action by the electronic devices 220 and 222.

Thus, data may be exchanged in both directions between the electronic devices and the host cloud 202. The electronic devices 220 and 222 can transmit data to the host cloud 202 regarding, for example, the state of the electronic devices or other objects or circumstances in the environment of the electronic devices. At the same time, the host cloud 202 can transmit data to the electronic devices 220 and 222, for example, instructions or commands to perform some action.

In this ecosystem, there are electronic device manufacturers who create electronic devices capable of connecting to an IoT network and/or a cloud-based platform for collecting data from the electronic devices. Users or consumers of the electronic devices generate data that is then passed to the host cloud 202 through the corresponding external cloud, and the data is hosted or stored in a memory or database 240 of the host cloud 202. Application developers can then use or connect to a user interface of the host cloud 202 (described in more detail below) to create applications to utilize the data for a suitable purpose. In some instances, such application developers may be users of the electronic devices or manufacturers of the electronic devices, who wish to enable additional functionality by utilizing the data collected from the electronic devices.

Figure 3A:
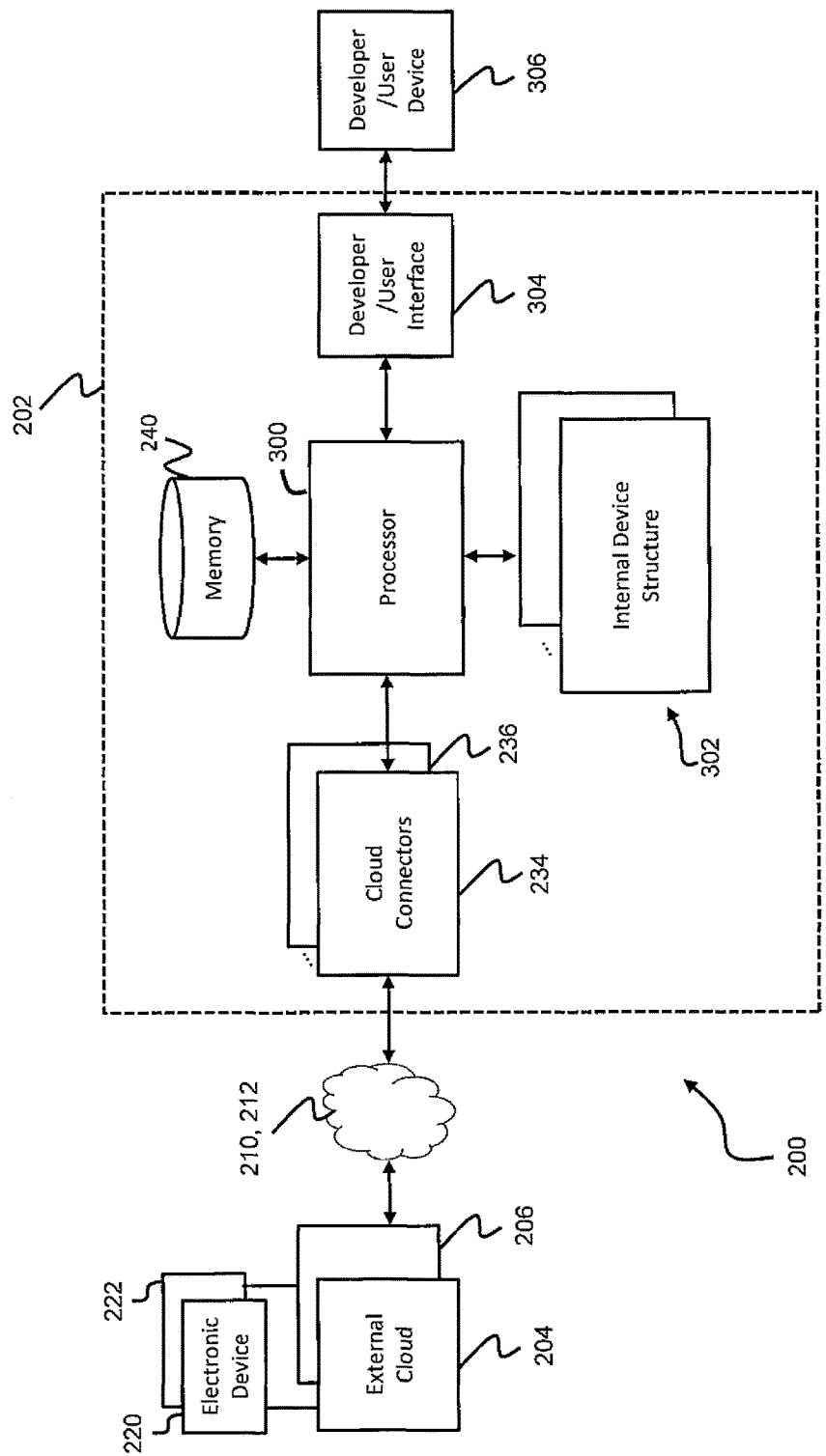
FIG. 3A is a block diagram illustrating further detail of a host cloud operating as part of the electronic communication system, according to one embodiment.

FIG. 3A is a schematic block diagram illustrating further detail of the host cloud 202 operating as part of the electronic communication system 200, according to some embodiments of the present disclosure. The host cloud 202 includes a processor or central processing unit (CPU) 300, which executes program instructions and interacts with other system components and software modules to perform various methods and operations according to embodiments of the present disclosure. The CPU 300 may also include (or be in electronic communication with), for example, a graphics processing unit (GPU) for processing signals and data to display images on a display.

The host cloud 202 further includes the memory 240, which may include one or more memory devices. For example, the memory 240 may include an addressable memory unit for storing software instructions to be executed by the CPU 300. The addressable memory unit of the memory 240 may be implemented using any suitable memory device, such as a random access memory (RAM), and may additionally operate as a computer readable storage medium having non-transitory computer readable instructions stored therein that when executed by the processor cause the processor to control and manage the exchange of data and instructions between various electronic devices by way of corresponding electronic clouds. The memory 240 may further include a mass storage device or database. For example, the mass storage device may store information about one or more cloud connectors and information about one or more electronic devices, as will be discussed in more detail below.

The host cloud 202 is connected to (e.g., in electronic communication with) one or more external clouds 204 and 206. The number of external clouds may vary according to the design of the electronic communication system 200, and is not limited to the number illustrated in FIG. 3A. The external clouds 204 and 206, in turn, are connected to (e.g., in electronic communication with) one or more electronic devices 220 and 222, as discussed above with respect to FIGS. 1 and 2.

The host cloud 202 operates as a centralized platform for facilitating the collection, storage, analysis, and exchange of data and instructions between various electronic devices. In this regard, the host cloud 202 hosts one or more cloud connectors (or cloud connector modules) 234, 236, configured with computer program instructions for transmitting data to and receiving data from the external clouds 204 and 206 by way of calls to the APIs of the external clouds.

The number of cloud connectors may vary according to the design and function of the electronic communication system 200, and is not limited to the number illustrated in FIG. 3A. For example, each different external cloud connected to the host cloud 202 may have one or more corresponding cloud connectors for interfacing with the API of the external cloud. In some embodiments, the cloud connectors may be stored in a cloud connector database hosted in the memory 240.

Additionally, for upon subscribing with the external clouds to receive data regarding a particular electronic device, the process for which is described in more detail below, the host cloud 202 may instantiate or create an internal data structure or representation of each electronic device, collectively referred to as internal device structure 302. The number of internal device structures 302 may vary according to the design of the electronic communication system 200 and the number of electronic devices to which the host cloud 202 subscribes for exchange of data. For example, the internal device structure may include information or data about the electronic devices, such as a unique device identification number (device ID) assigned to each device by the host cloud 202, a corresponding device ID assigned to each device by the external cloud, the authentication credentials (e.g., a token and a refresh token for OAuth1 or OAuth2) for authenticating with the external cloud, the type of electronic device, sensor or operation capabilities of the electronic device, device status, data transmitted to or received from the electronic device, and the like. In some embodiments, the internal device structures 302 may be stored in an internal device structure data base hosted in the memory 240.

FIG. 3B shows example code for data to be stored as part of an internal representation on a host cloud of an electronic device, according to one embodiment. As shown in FIG. 3B, the internal representation or structure of the electronic device may include a uniform resource locator (URL) for performing an authorization request. Additionally, the internal representation of the electronic device may include a URL for an Access Token Request for authenticating with the external cloud. Further, the internal representation of the electronic device may include a mapping table for renaming parameters on the response of an Access Token Request. Additionally, as discussed above, identification data (clientId) may be provided by the external cloud and stored as part of the internal representation of the electronic device on the host cloud. The internal representation of the electronic device may further include private information or data (clientSecret) provided by the third party cloud to the host cloud. The authentication protocol for connecting to the third party cloud may also be included as part of the internal representation of the electronic device.

Returning to FIG. 3A, the host cloud 202 may further include a developer and/or user interface module 304 for facilitating or coordinating the development of the cloud connectors by developers operating a developer device 306 (e.g., a desktop computer system having Internet browser functionality) and/or connecting an individual electronic device to a cloud connector. Further detail of the developer interface is described below with respect to FIGS. 4A-4E.

Accordingly, the host cloud 202 provides a platform for creating cloud connectors for interfacing with external clouds to exchange data regarding electronic devices sending data to the external clouds. By utilizing the host cloud 202 to create cloud connectors for different electronic devices, users may be enabled to exchange data and instructions between different electronic devices by way of the external clouds collecting data from the external devices.

Figure 4A:
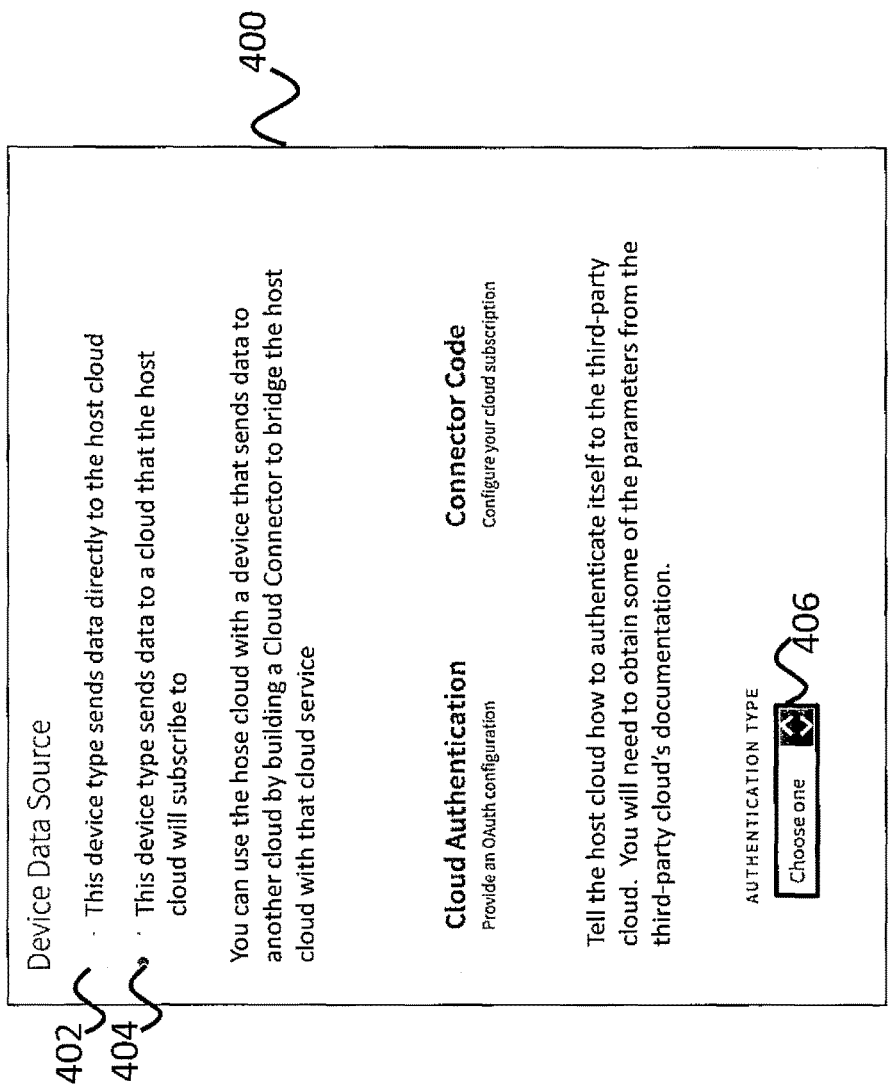
FIG. 4A illustrates aspects of a user interface for creating a cloud connector, according to one embodiment.

FIGS. 4A-4D illustrate details of a user interface and process for creating a cloud connector according to an example embodiment of the present disclosure. FIG. 4A illustrates an example user interface 400 for creating a cloud connector according to some embodiments. To connect the host cloud (e.g., the host cloud 202) to an external cloud (e.g., the external cloud 204 or 206), a cloud connector is created and instantiated within the host cloud as discussed above. As shown in FIG. 4A, the user interface 400 may include one or more fields for defining the type of electronic device to be connected to the host cloud. For example, the user interface 400 may include a field or selectable option 402 for defining the device type as one that directly connects to the host cloud 202. Additionally, the user interface 400 may include a field or selectable option 404 for defining the device type as one that sends data to an external cloud that the host cloud will subscribe or connect to by way of a cloud connector and the external cloud API.

According to some embodiments of the present disclosure, the user interface 400 may further include a field or selectable option 406 for defining the authentication protocol for authenticating or obtaining permission to interact with the external cloud, for the case where the user or developer selects the selectable option 404 for bridging with an external cloud.

In response to selecting the selectable option 404, the user interface 400 may display a window or tab 410 for defining the parameters of the selected authentication protocol. Any suitable authentication protocol may be utilized according to the design and function of the electronic communication system 200 and the external cloud to be connected to the host cloud. According to some embodiments of the present disclosure, the authentication protocol may include OAuth1 and/or OAuth2, but embodiments of the present disclosure are not limited thereto, and any other suitable authentication protocol may be utilized as supported by the third-party or external cloud.

Figure 4C:
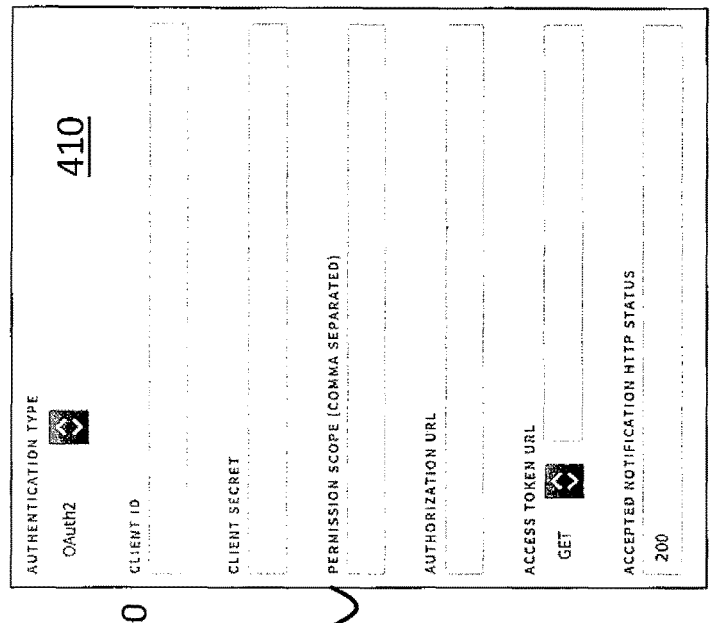
FIG. 4C illustrates additional aspects of the user interface for creating a cloud connector, according to one embodiment.
Figure 4B:
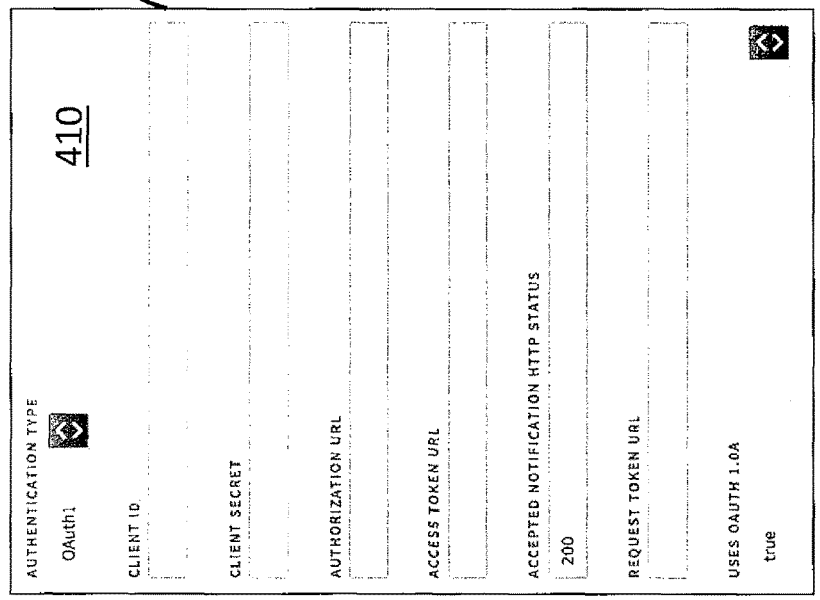
FIG. 4B illustrates additional aspects of the user interface for creating a cloud connector, according to one embodiment.

FIGS. 4B and 4C illustrate example fields for defining the parameters of the authentication protocol if OAuth1 is selected or OAuth2 is selected, respectively. Various parameters of the OAuth1 and OAuth2 authentication protocol that may be defined in the window 410 are shown below in Tables 1 and 2, respectively.

TABLE 1

OAuth1 Parameters

| Parameter Name | Description | Default Value |
| --- | --- | --- |
| Request Token URL | The request token URL provided by the third-party or external cloud | |
| AccessTokenURL | The access token URL provided by the third-party or external cloud. | |
| AuthorizationURL | The authorization URL provided by the third-party or external cloud. | |
| Consumer Key | The consumer ID provided by the third-party cloud. | |
| Signature Method | The signature method to use in the OAuth1 flow (e.g., HMAC-SHA1, RSA-SHA1, Plaintext) | HMAC-SHA1 |
| Transmission Method | When making an OAuth-authenticated request, protocol parameters as well as any other parameter using the "oauth_" prefix may (or shall) be included in the request using one of the following locations, listed in order of decreasing preference: HTTP Authorization header, HTTP request entity-body, HTTP request URI query | HTTP Authorization header |
| Credential Parameters | A map to identify the fields "userid", "token", "secret", "external_id" in the request. | Identity |

TABLE 2

OAuth2 Parameters

| Parameter Name | Description | Default Value |
| --- | --- | --- |
| AuthorizationURL | The authorization URL provided by the third-party or external cloud. | |
| Access Token URL | The access token URL provided by the third-party or external cloud. | |
| Client ID | The client ID provided by the third-party or external cloud. | |
| Client Secret | The client secret provided by the third-party or external cloud. | |
| Scope | The OAuth2 scope parameter provided by the third-party or external cloud. | |
| Credential Params | A map to identify the following fields in the request: access_token, token_type, refresh_token, expires_in, external_id | Identity |

As shown above in Tables 1 and 2, certain parameters may be obtained from third-party or external cloud documentation. Other parameters such as client ID and client secret may be provided only once an application is defined on the third-party or external cloud.

Figure 4D:
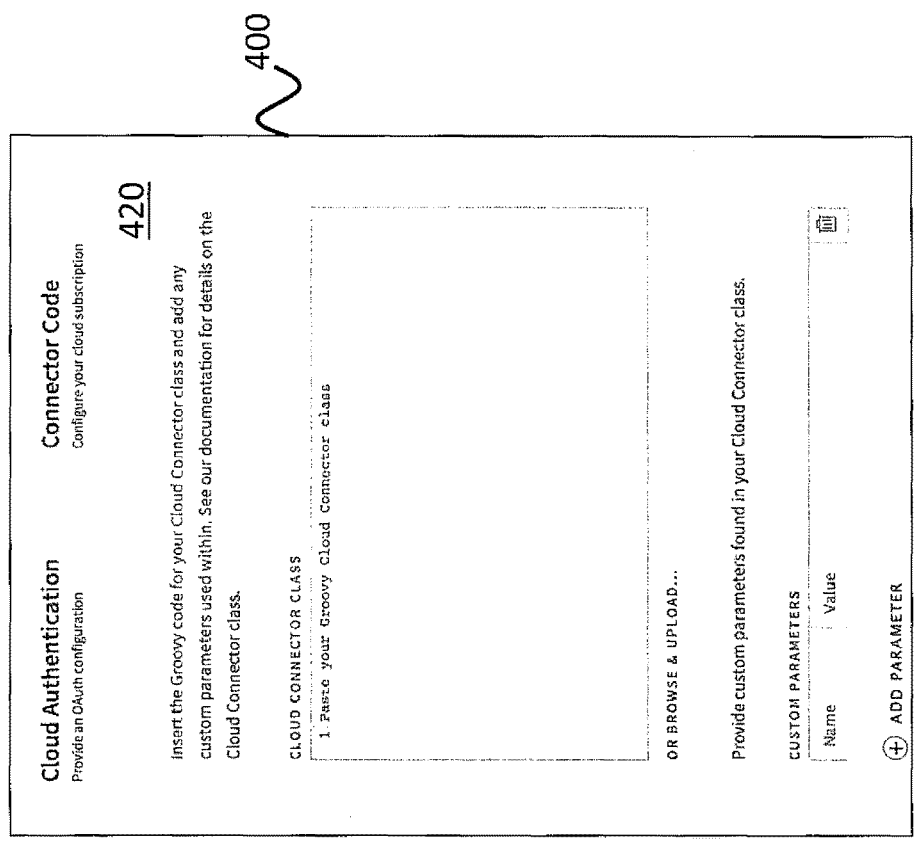
FIG. 4D illustrates additional aspects of the user interface for creating a cloud connector, according to one embodiment.

Once the parameters for authenticating with the external cloud are defined as described above with respect to FIGS. 4B and 4C, and Tables 1 and 2, the user interface 400 may display a window or tab 420 for defining the code or indicating to the host cloud how to interact with the third-party or external cloud API, in order to exchange data with the external cloud. According to some embodiments of the present disclosure, the Apache Groovy programming language may be utilized to provide instructions to the host cloud for interacting with (e.g., making API calls to) the external cloud API, but embodiments of the present disclosure are not limited thereto, and any suitable programming language may be utilized to define the API calls for exchanging data with the external cloud through its API. According to some embodiments of the present disclosure, a text or data file including the cloud connector code may be uploaded to the host cloud by way of the user interface 400, or the text may be inserted into a text field as shown in FIG. 4D. The cloud connector code may be implemented, for example, using a publicly available cloud connector software development kit (SDK), or publicly available cloud connector code samples for different external clouds.

According some embodiments, custom parameters may be included as part of the cloud connector, as illustrated in FIG. 4D. The values of custom parameters may not be hardcoded, but instead may be stored in a lookup table accessible by the cloud connector. Later on, if a user decides to change the value of a custom parameter, the user may only need to change the value in the lookup table instead of changing the overall code for the cloud connector.

Figure 4E:
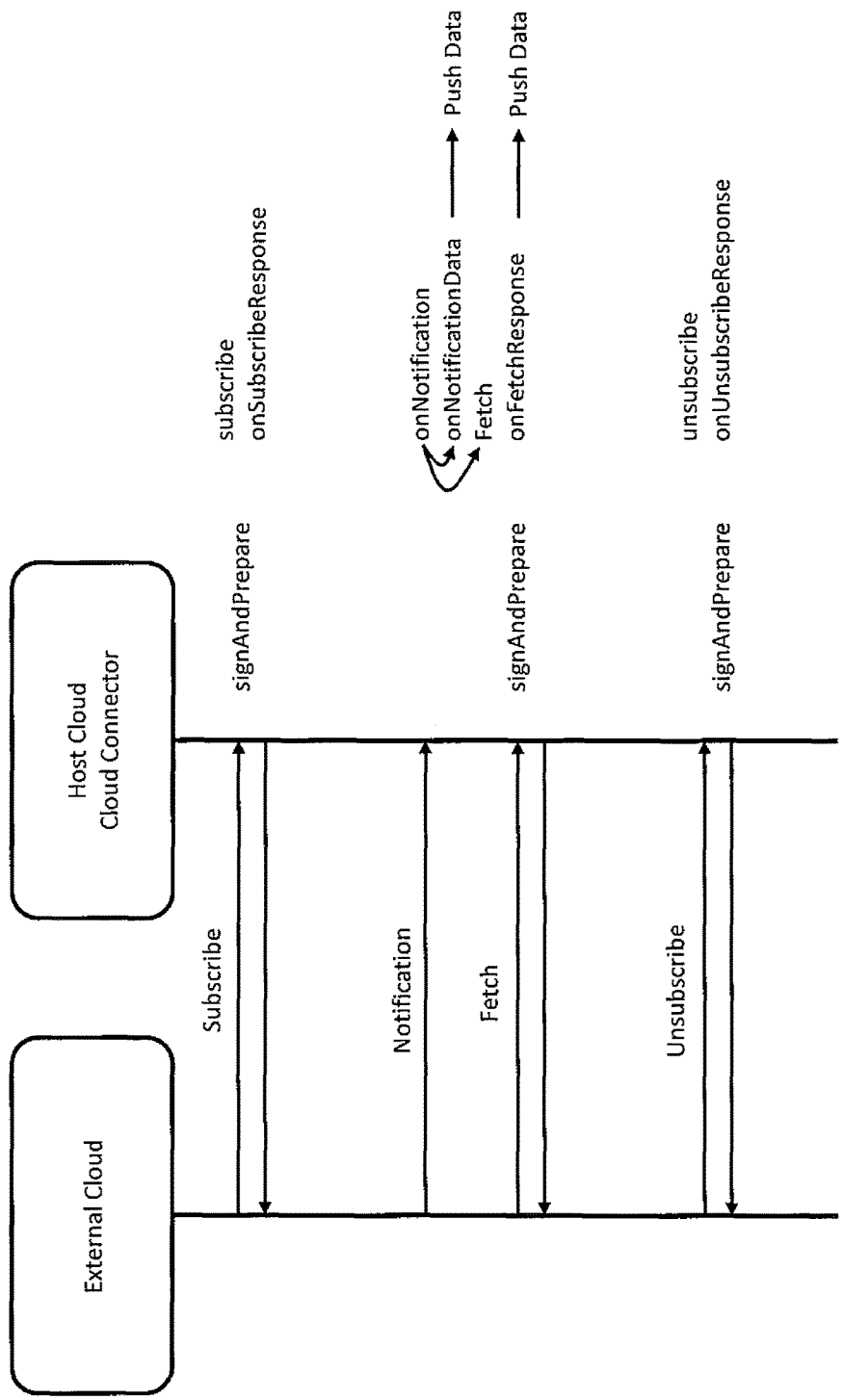
FIG. 4E illustrates additional aspects of the user interface for creating a cloud connector, according to one embodiment.

FIG. 4E illustrates a flow diagram of various operations that may be performed for individual cloud connectors on the host cloud. As illustrated in FIG. 4E, a cloud connector may utilize subscribe and notification API calls to access data in three operations. The subscribe operation includes a process of subscribing to notifications from the external cloud that data for a particular device is available to be transmitted to the host cloud. The notification operation includes a process of receiving a notification that data is available that corresponds to a particular electronic device. According to some embodiments, the available data may be transmitted from the external cloud to the host cloud along with the notification, or the available data may be transmitted as part of a separate transmission from the notification transmission. The fetch operation includes a call to the API of the external cloud to push the available data from the external cloud to the host cloud.

Additional operations may be included as part of the cloud connector as shown in table 3 below:

TABLE 3

| Operation | Description |
| --- | --- |
| signAndPrepare | Called at the beginning of the operations initiated by the host cloud (e.g., subscribe, fetch, and unsubscribe). According to some embodiments, a generic process or operation (e.g., add headers and signature) may be implemented as part of this operation. |
| subscribe | Called by the host cloud when a user has completed the authentication process for a particular electronic device. The operation generates URLs (zero or more) to call an endpoint of the external cloud to subscribe to notifications for the particular electronic device. |
| onSubscribeResponse | Called by the host cloud for each response from the external cloud to the requests created in the subscribe operation. This operation processes the result of the subscriptoin, and additional logic may be added according to some embodiments. |
| onNotification | A callback method triggered when the external cloud sends a notification to the host cloud. The operation extracts parameters within the notification. If the notification contains data, the data is transmitted to the host cloud (using onNotificationData), otherwise a fetch operation is performed. |
| onNotificationData | Write data received inside the notification in the host cloud |
| fetch | Called by the host cloud for each HTTP request returned by onNotification. The operation allows users to customize the request using the selected electronic device's parameters, and the request will be used to fetch data from the external cloud. |
| onFetchResponse | Called by the host cloud for each response from the external cloud to the requests created in the fetch operation. The operation obtains the data from the response and pushes the data to the host cloud. |
| unsubscribe | Called by the host cloud when a user disconnects an electronic device. |
| onUnsubscribeResponse | Called by the host cloud for each response from the external cloud to the requests created during the unsubscribe operation. |
| onAction | Called for each action received for the current electronic device. Programmer can use this to prepare a new request to fetch or directly send data to the host cloud using onActionData. |
| onActionData | Generate data using the information coming from the action received. |

According to some embodiments of the present disclosure, a cloud connector may undergo a rigorous approval process before it can be utilized to connect the host cloud to the external cloud. For example, the approval process may involve confirming that the programming instructions for the cloud connector do not include any operations or instructions that may be capable of enabling malicious or harmful actions by users of the cloud connector.

Figure 5B:
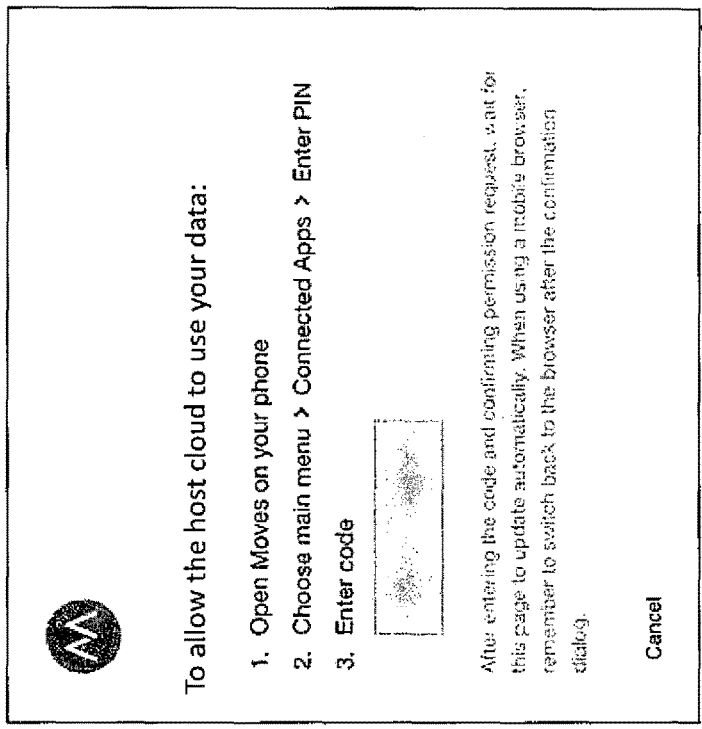
FIG. 5B illustrates additional aspects of the user interface for authorizing a host cloud to exchange data regarding an electronic device, according to one embodiment of the present disclosure.
Figure 5A:
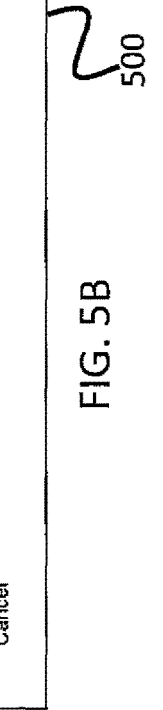
FIG. 5A illustrates aspects of a user interface for authorizing a host cloud to exchange data regarding an electronic device, according to one embodiment of the present disclosure.

Once a developer has created a cloud connector, any user may connect a device of the device type for the cloud connector. For example, the user may access a user interface 500, by way of the electronic device itself or another electronic device, and approve authorization of the device, as illustrated in FIGS. 5A and 5B. The user may authenticate once with the external cloud, for example, by selecting an "authorize" button as illustrated in FIG. 5A. Then, the authorization process may be initiated by walking through an authorization process as illustrated in FIG. 5B. The authentication process (e.g., following an OAuth1 or OAuth2 protocol) may display a user interface to the user, for example, by way of a web page hosted by the external cloud. Once the authentication process is completed, the host cloud may be enabled to exchange data with the device by way of the external cloud.

Figure 6:
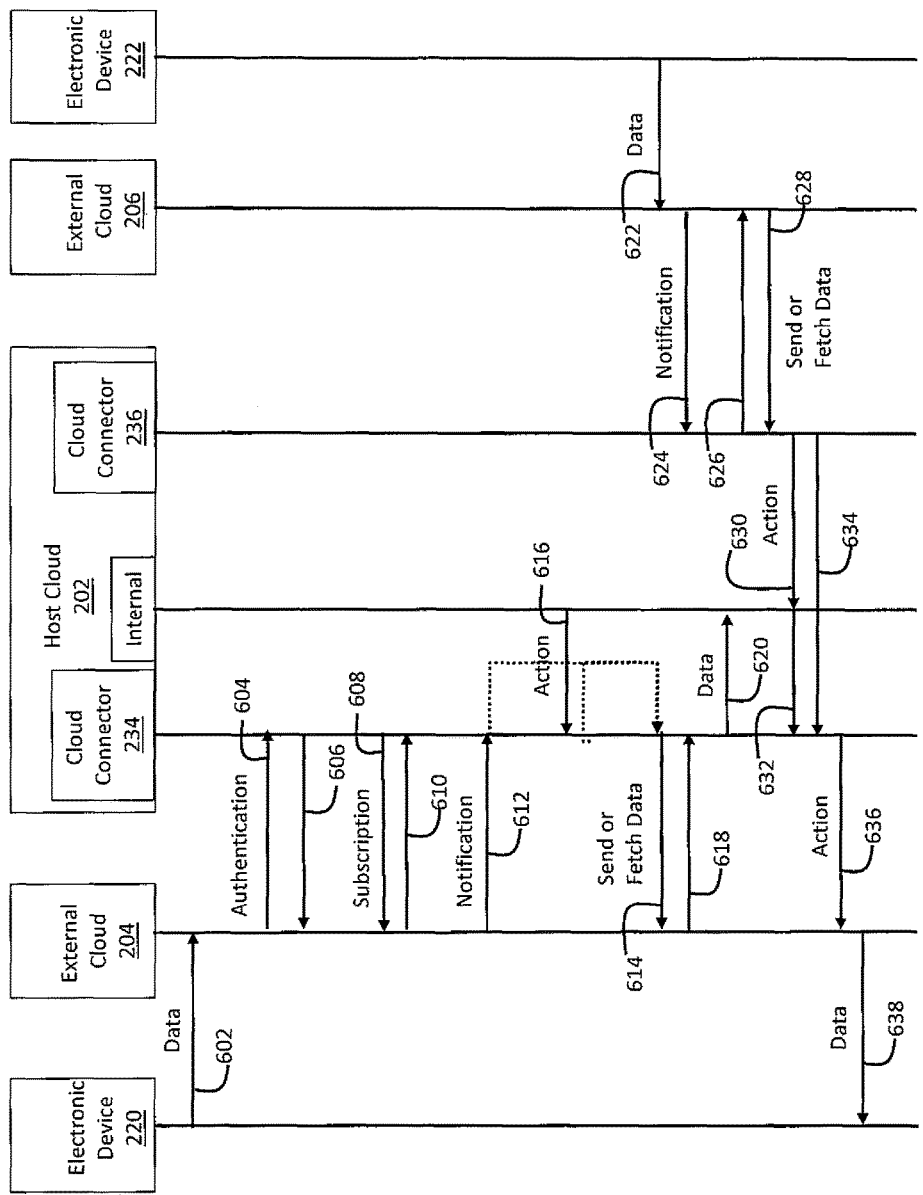
FIG. 6 is a flow diagram illustrating a process for exchanging data between a host cloud and one or more external clouds, and between a host cloud and one or more electronic devices, according to one embodiment.

FIG. 6 illustrates a flow diagram for exchanging data between a host cloud and one or more external clouds, and between a host cloud and one or more electronic devices, according to some embodiments of the present disclosure. The process shown in FIG. 6 is merely to illustrate aspects of the present disclosure by way of an example use case, but embodiments of the present disclosure are not limited thereto. For example, the number and order of the operations illustrated in FIG. 6 may vary according to the particular use case being implemented by users.

As illustrated in FIG. 6, at 602, an electronic device 220 transmits data to an external cloud 204. A cloud connector 234, hosted on the host cloud 202 may be created for the purposes of interfacing with the API of the external cloud 204. At 604 and 606, the cloud connector 234 engages in an authentication process with the external cloud 204 using any suitable authentication protocol known in the art (e.g., OAuth1, OAuth2, etc.), as discussed above with respect to FIGS. 4A-4E. According to some embodiments of the present disclosure, depending on the requirements of the external cloud 204, an authentication process may not be necessary.

At 608 the cloud connector 234 may transmit a signal requesting to subscribe to data about a particular electronic device 220 with which the external cloud 204 is communicating and exchanging data. According to some embodiments, the signal at 608 may include unique identifying information related to the user of the particular electronic device 220 and/or identifying information about the electronic device 220. In response, at 610, the external cloud 204 may transmit a confirmation signal to the cloud connector 234 indicating the subscription was successful. Additionally, at 610, the signal may include unique identifying information for the electronic device 220 as it is represented on the external cloud 204.

When the external cloud 204 receives data from the electronic device 220, the external cloud 204 may transmit a notification signal to the cloud connector 234 at 612. According to some embodiments, the notification signal may include the data from or regarding the electronic device 220. Alternatively, in response to the notification at 612, the cloud connector 234 may transmit a signal or request at 614 to fetch the data from the external cloud 204. According to some embodiments, the request at 612 may be initiated by an action or request from the host cloud or the internal representation of the electronic device at 616. For example, the host cloud or the internal representation of the electronic device may initiate the action at 616 to request data from the external cloud 204 regarding the present status or condition of the electronic device. Additionally, an action or request may be received from an application (e.g., an application running on the host cloud 202 or an external device or cloud) using the API of the host cloud 202.

At 618, the external cloud 204 transmits the requested data to the cloud connector 234, where the data is converted or adjusted according to the parameters of the internal representation of the electronic device, before being stored for the internal representation of the device at 620. For example, the cloud connector may manipulate, filter, convert, format, or modify the data according to the design and functionality of the cloud connector and/or the device.

According to some embodiments of the present disclosure, the host cloud 202 may act as an intermediary to enable or facilitate the exchange of data or instructions between two different electronic devices 220 and 222, each of which transmit data to external clouds 204 and 206, respectively. For example, at 622, an electronic device may transmit data to external cloud 206, such as an instruction to manipulate or control the operation of the electronic device 220.

At 624, the external cloud 206 may transmit a notification or signal to the cloud connector 236 corresponding to the external cloud 206 to notify the host cloud 202 that data was received from the electronic device 222. According to some embodiments, the notification at 624 may include the data, or the data may be fetched at 626 and 628, similar to 614 and 618 described above.

At 630, the cloud connector 236 may transmit a signal or action to the internal representation of the electronic device 220 in response to receiving the data regarding the electronic device 222. At 632, a signal or action may be transmitted from the internal representation of the electronic device 220 to the cloud connector 234. According to some embodiments, at 634, the cloud connector 236 may transmit a signal or action to the cloud connector 234 without the action passing through the internal representation of the electronic device 220. At 636, the action or instruction is transmitted from the cloud connector 234 to the external cloud 204, which then passes the data to the electronic device 220 at 638.

Accordingly, as illustrated in FIG. 6, embodiments of the present disclosure provide a framework or platform for exchanging data between electronic devices that are not directly communicating with one another, but are each in electronic communication with a third-party or external cloud, by utilizing a host cloud as an intermediary. Additionally, the host cloud may exchange data or instructions with various external clouds that have an available API for sending and receiving data. Thus, embodiments of the present disclosure provide a mechanism, using the cloud connector interface, for collecting data from electronic devices associated with or in communication with third-party or external clouds without communicating directly with the electronic devices.

In many instances, third-party or external clouds do not utilize any standard API. The cloud connectors of the present disclosure create a framework for enabling communication with third-party cloud networks, even though each third-party cloud API may function very differently.

The cloud connectors are hosted by the host cloud infrastructure. Many third-party or external clouds utilize a hypertext transfer protocol (HTTP) representational state transfer (REST) API, but the particular calls, functions, or commands are not standardized. According to some embodiments, the host cloud may utilize cloud connectors to connect to the custom parameters of any external cloud that utilizes an HTTP API (e.g., an HTTP REST API).

In order to provide access to the host cloud to the data hosted on an external cloud, the host cloud may be authenticated with the external cloud using any suitable authentication protocol, for example, normalized OAuth1 or OAuth2.

Additionally, the host cloud may subscribe to receive data regarding individual electronic devices that exchange data with the external cloud. According to some embodiments, a notification may be transmitted from the external cloud to the corresponding cloud connector of the host cloud when data is available regarding the electronic device. Additionally, the host cloud may pull data in a data fetch process from the external cloud, either in response to a notification or without any notification.

Additionally, data and actions may be transmitted from the host cloud to the external cloud (e.g., by using an HTTP call). Thus, there may be two-way communication between the host cloud and the external cloud. That is, data may be pushed from the external cloud to the host cloud using a notification mechanism, data may be pulled from the external cloud by the host cloud on reception of the notification or in response to an action by the external cloud, and data may be pushed from the host cloud to the external cloud and/or the electronic device associated with the external cloud.

According to some embodiments of the present disclosure, anyone can create a cloud connector by way of a developer interface, and the host cloud need not necessarily actively collaborate with the external cloud in order to enable exchange of data between the host cloud and the external cloud. So long as the external cloud provides a publicly available API, it may be possible for anyone to develop a cloud connector for implementing in accordance with the present disclosure.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although this disclosure has been described in certain specific embodiments, those skilled in the art will have no difficulty devising variations to the described embodiment, which in no way depart from the scope and spirit of the present disclosure. Furthermore, to those skilled in the various arts, the disclosure itself herein will suggest solutions to other tasks and adaptations for other applications. It is the applicant's intention to cover by claims all such uses of the disclosure and those changes and modifications which could be made to the embodiments of the disclosure herein chosen for the purpose of disclosure without departing from the spirit and scope of the disclosure. Thus, the present embodiments of the disclosure should be considered in all respects as illustrative and not restrictive, the scope of the disclosure to be indicated by the appended claims and their equivalents.

What is claimed is:

1. An electronic device for improving functionality of, and exchange of data between, electronic devices that are connected to a network, the electronic device comprising:
    a processor; and
    a memory coupled to the processor, wherein the memory stores instructions that, when executed by the processor, cause the processor to:
        transmit a request, from a software embodiment of a first cloud connector module to a first external cloud, to receive data regarding a first electronic device in communication with the first external cloud;
        receive the data regarding the first electronic device from the first external cloud;
        store, in the memory, the data regarding the first electronic device as part of a representation of the first electronic device;
        use the data regarding the first electronic device stored in the memory to instantiate an internal device structure serving as a representation for a corresponding electronic device for each of the electronic devices that are connected to the network;
        receive data regarding a second electronic device from a second external cloud via a software embodiment of a second cloud connector; and
        transmit a signal to the first external cloud in response to receiving the data regarding the second electronic device for controlling an operation of the first electronic device.

2. The electronic device of claim 1, wherein the instructions further cause the processor to transmit a signal to authenticate the first cloud connector module for permission to access information stored on the first external cloud.

3. The electronic device of claim 1, wherein the first cloud connector module is unique to the first external cloud.

4. The electronic device of claim 1, wherein the instructions further cause the processor to transmit a request from the first cloud connector module to the first external cloud to subscribe to notifications from the first external cloud regarding data received from the first electronic device.

5. The electronic device of claim 1, wherein the instructions further cause the processor to receive a notification from the first external cloud that the first external cloud has received the data regarding the first electronic device.

6. The electronic device of claim 1, wherein the data regarding the second electronic device comprises an instruction to transmit a signal to the first electronic device for controlling the operation of the first electronic device.

7. An electronic communication system for improving functionality of, and exchange of data between, electronic devices that are connected to a network, the electronic communication system comprising:
    a server comprising a processor and a memory having data corresponding to a first electronic device stored in the memory;
    a software embodiment of a first cloud connector module configured to interact with an application program interface (API) of a first external cloud system; and
    a software embodiment of a second cloud connector module configured to interact with an API of a second external cloud system,
    wherein the electronic communication system is configured to instantiate an internal device structure serving as a representation for a corresponding electronic device for each of the electronic devices that are connected to the network, and
    wherein the server is configured to facilitate transmission of a signal to the first external cloud system in response to receiving the data regarding a second electronic device connected to the second external cloud system for controlling an operation of a first electronic device connected to the first external cloud system.

8. The electronic communication system of claim 7, wherein the data corresponding to the first electronic device comprises unique identification information corresponding to the first electronic device.

9. The electronic communication system of claim 7, wherein the server is configured to receive information regarding the first electronic device by way of the first cloud connector module.

10. The electronic communication system of claim 7, wherein the server is configured to receive information regarding a second electronic device by way of the second cloud connector module.

11. The electronic communication system of claim 10, wherein the information regarding the second electronic device comprises an instruction for controlling an operation of the first electronic device.

12. The electronic communication system of claim 11, wherein the server is configured to transmit a signal to the first external cloud system for controlling the operation of the first electronic device in response to receiving the information regarding the second electronic device.

13. A method of managing electronic communications for improving functionality of, and exchange of data between, electronic devices that are connected to a network, the method comprising:
    transmitting, by a processor, a request, from a software embodiment of a first cloud connector module to a first external cloud, to receive data regarding a first electronic device in communication with the first external cloud;

receiving, by the processor, the data regarding the first electronic device from the first external cloud by way of the first cloud connector module;

storing, by the processor, in a memory, the data regarding the first electronic device as part of a representation of the first electronic devices;

using the data regarding the first electronic device stored in the memory to instantiate an internal device structure serving as a representation for a corresponding electronic device for each of the electronic devices that are connected to the network;

receiving, by the processor, data regarding a second electronic device from a second external cloud by way of a software embodiment of a second cloud connector module; and transmitting, by the processor, a signal to the first external cloud in response to receiving the data regarding the second electronic device for controlling an operation of the first electronic device.

14. The method of claim 13, further comprising transmitting, by the processor, a signal to authenticate the first cloud connector module for permission to access information stored on the first external cloud.

15. The method of claim 13, wherein the first cloud connector module is unique to the first external cloud.

16. The method of claim 13, wherein the second cloud connector module is unique to the second external cloud.

17. The method of claim 13, further comprising transmitting, by the processor, a request from the first cloud connector module to the first external cloud to subscribe to notifications from the first external cloud regarding data received from the first electronic device.

18. The method of claim 13, further comprising receiving, by the processor, a notification from the first external cloud that the first external cloud has received the data regarding the first electronic device.

19. The method of claim 13, wherein the data regarding he second electronic device comprises an instruction to transmit a signal to the first electronic device for controlling the operation of the first electronic device.

20. The method of claim 13, wherein the first cloud connector module and the second cloud connector module are unique to the first external cloud and the second external cloud, respectively.

* * * * *